(No Model.)
W. T. PARKS.
WINDOW FLY TRAP.
No. 356,374. Patented Jan. 18, 1887.
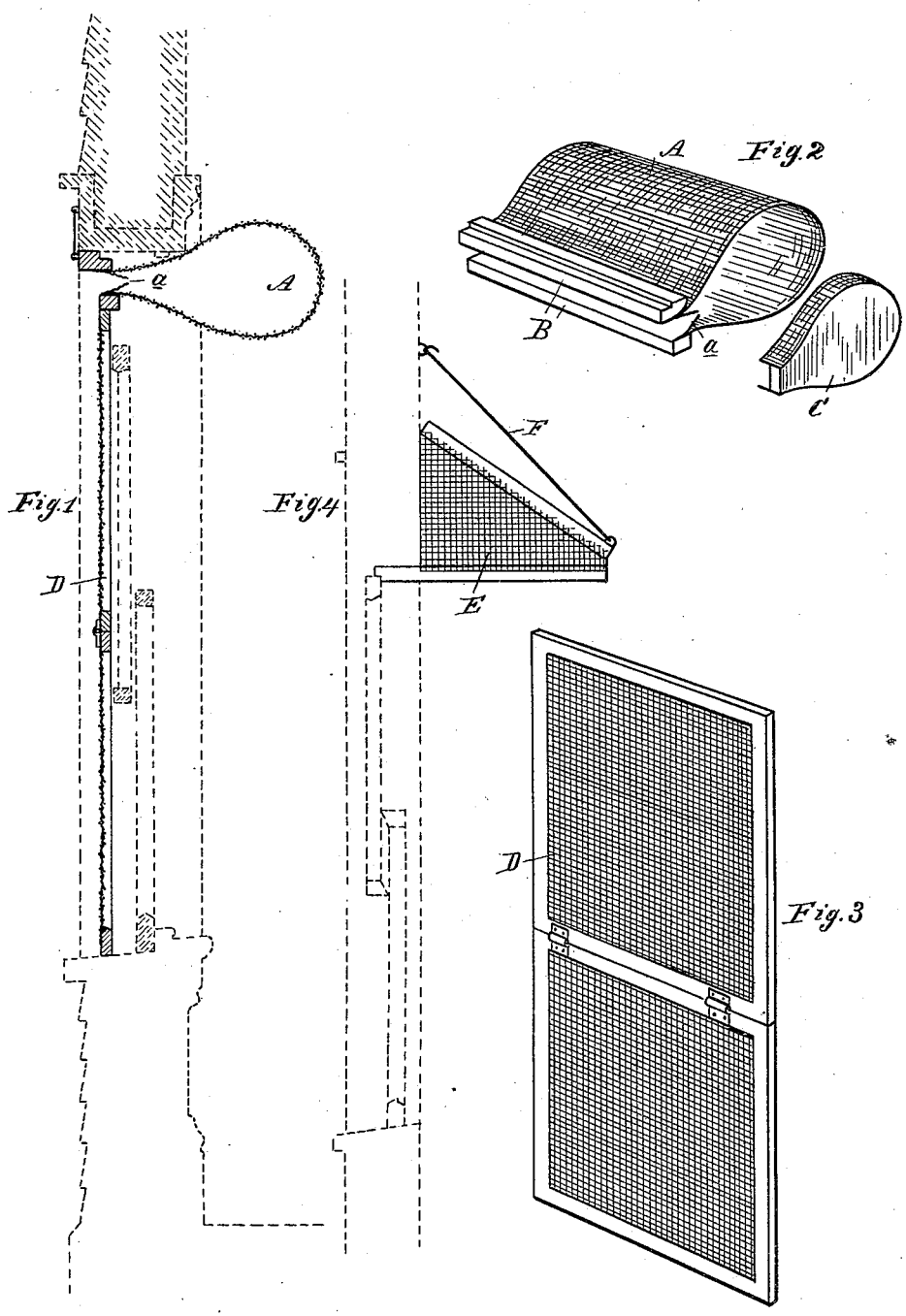
Attest:
John Schuman.
A. J. Sprague
Inventor:
William T. Parks.
by his Att'y
Thos. S. Sprague

United States Patent Office.

WILLIAM T. PARKS, OF LAGRANGE, INDIANA.

WINDOW FLY-TRAP.

SPECIFICATION forming part of Letters Patent No. 356,374, dated January 18, 1887.

Application filed November 11, 1886. Serial No. 218,562. (No model.)

*To all whom it may concern:*

Be it known that I, WILLIAM T. PARKS, of Lagrange, in the county of Lagrange and State of Indiana, have invented new and useful Improvements in Window Fly-Traps; and I do hereby declare that the following is a full, clear, and exact description thereof, reference being had to the accompanying drawings, which form a part of this specification.

This invention relates to certain new and useful improvements in the construction of window fly-traps.

The invention consists in the peculiar construction and application of a trap to a window, whereby the flies and other insects are prevented from entering the apartment, while at the same time they are entrapped, and in the peculiar construction, arrangement, and combinations of the various parts, all as more fully hereinafter set forth.

Figure 1 is a vertical section of a window, showing the application of my trap. Fig. 2 is a perspective view of the trap removed. Fig. 3 is a perspective view of a folding screen. Fig. 4 is a section showing the folding screen employed as a modification of the trap shown in Fig. 3.

In the accompanying drawings, which form a part of this specification, A represents a trap, the body of which is preferably formed of wire-cloth bent into the form shown, the parallel edges being provided with cleats B. One end of this trap is provided with a rigid head, while the opposite end is provided with a removable head, C. Secured to the strips or cleats B are the inwardly-projecting wings *a*, the free edges of which converge toward each other, but leaving a slight opening between them.

In applying this trap the upper sash is lowered sufficiently to allow of the insertion of the strips B between such sash and the window-frame, care being taken not to force the wings *a* together, the trap extending into the room. Flies or other insects seeking an entrance to the room will crawl in between the wings *a* into the body of the trap, but they will be prevented from escaping therefrom by said wings. After a number of insects have been entrapped the device can readily be removed from the window, boiling water being poured upon the insects to destroy them, when, by removing the head C, they may be shaken out upon the ground.

D is a folding screen, which may be used in connection with the trap A, as shown in Fig. 1, in which case said trap is secured between the upper end of the screen and the window-frame. This allows of a free adjustment of the window-sash for the purpose of more ventilation without disturbing the screen or trap.

As a modification of the trap A, shown in Fig. 1, the folding screen D may be employed, as shown in Fig. 4, in which case side screens, E, should be provided for the ends, so as to prevent the insects getting into the room. In this application a rod, F, or other suitable device, should be employed for supporting the outer end of the strap so formed.

I am aware that insect-traps have been provided with inwardly projecting and converging wings, and do not seek to cover such construction, broadly.

I am also aware that a bag of netting or the like has been placed between the window sash and sill for the like purpose, but do not claim such.

What I claim as my invention is—

The trap A, composed of the cleats B B', the collapsible body having its parallel edges secured to said cleats, the inwardly projecting and converging wings *a a*, secured to said cleats, and the detachable head C, all substantially as shown and described.

WM. T. PARKS.

Witnesses:
 H. S. SPRAGUE,
 E. SCULLY.